United States Patent
Shafer et al.

(10) Patent No.: US 7,791,540 B2
(45) Date of Patent: Sep. 7, 2010

(54) RFID NEAR FIELD MICROSTRIP ANTENNA

(75) Inventors: Gary Mark Shafer, Charlotte, NC (US); Karen Bellum Bomber, Boca Raton, FL (US); George A. Reynolds, Jr., Clemson, SC (US); John Ford, Boca Raton, FL (US); Ming-Ren Lian, Boca Raton, FL (US); Edward Di Carlo, Boca Raton, FL (US); Richard L. Copeland, Boca Raton, FL (US); Marcus Christopher, Simpsonville, SC (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 342 days.

(21) Appl. No.: 11/665,622

(22) PCT Filed: Nov. 2, 2005

(86) PCT No.: PCT/US2005/039595

§ 371 (c)(1),
(2), (4) Date: Apr. 18, 2008

(87) PCT Pub. No.: WO2006/050412

PCT Pub. Date: May 11, 2006

(65) Prior Publication Data

US 2009/0015480 A1    Jan. 15, 2009

Related U.S. Application Data

(60) Provisional application No. 60/624,402, filed on Nov. 2, 2004, provisional application No. 60/659,288, filed on Mar. 7, 2005.

(51) Int. Cl.
H01Q 1/32    (2006.01)
(52) U.S. Cl. .............................................. 343/700 MS

(58) Field of Classification Search .......... 343/700 MS, 343/702, 895; 340/572.7; 455/562.1
See application file for complete search history.

(56) References Cited

U.S. PATENT DOCUMENTS

| 5,896,563 | A | 4/1999 | Kawanami et al. |
| 7,396,054 | B2 * | 7/2008 | Carrier ........................ 292/75 |
| 7,639,142 | B2 * | 12/2009 | Roeder et al. ............ 340/572.4 |

(Continued)

FOREIGN PATENT DOCUMENTS

JP    2002251594 A1    9/2002

(Continued)

OTHER PUBLICATIONS

"Near field and far field" article found at http://micronix-jp.com/english/Products/Product%20list/emc.eng.pdf.*

*Primary Examiner*—Huedung Mancuso
(74) *Attorney, Agent, or Firm*—Alan M. Weisberg; Christopher & Weisberg, P.A.

(57) ABSTRACT

A near field antenna is disclosed which is configured to read an RFID label such that a localized electric E field emitted by the antenna at an operating wavelength resides substantially within a zone defined by the near field. The localized E field directs a current distribution along an effective length of the antenna corresponding to a half-wave to a full-wave structure.

20 Claims, 16 Drawing Sheets

U.S. PATENT DOCUMENTS

| | | | |
|---|---|---|---|
| 2005/0159187 A1* | 7/2005 | Mendolia et al. | 455/562.1 |
| 2006/0066441 A1* | 3/2006 | Knadle et al. | 340/10.1 |
| 2007/0262873 A1* | 11/2007 | Tsirline et al. | 340/572.7 |
| 2007/0285335 A1* | 12/2007 | Bungo et al. | 343/895 |

FOREIGN PATENT DOCUMENTS

| | | |
|---|---|---|
| JP | 2002290141 A1 | 10/2002 |
| WO | 0036572 A1 | 6/2000 |

\* cited by examiner ured or read.

RFID NEAR FIELD MICROSTRIP ANTENNA

CROSS-REFERENCE TO RELATED APPLICATIONS

This application is a U.S. National Stage Application of PCT Application Number: PCT/US05/39595, filed Nov. 2, 2005 entitled "RFID NEAR FIELD MICROSTRIP ANTENNA," which claims the benefit of priority of U.S. Provisional Patent Application Ser. No. 60/624,402 by Shafer et al, entitled "NEAR FIELD PROBE FOR READING RFID TAGS AND LABELS AT CLOSE RANGE", filed on Nov. 2, 2004 and U.S. Provisional Patent Application Ser. No. 60/659,288 by Copeland et al, entitled "LINEAR MONO-POLE MICROSTRIP RFID NEAR FIELD ANTENNA", filed on Mar. 7, 2005, the entire contents of both of which being incorporated by reference herein.

BACKGROUND

Existing approaches for reading RFID labels employ a traditional antenna that provides the large read range for RFID labels. This approach provides a majority of the antenna energy to be used in the far field. The far field region is defined as distance $$d \gg \frac{\lambda}{2\pi},$$

where λ is the wavelength. For the UHF frequency 915 MHz, this value is about 5 cm. So, the far field region at 915 MHz is substantially beyond 5 cm, and similarly the near field region is substantially below 5 cm. Most RFID reader antennas are designed to read labels at the highest distances of several meters for example, which of course is well in the far field region.

In certain applications, namely RFID label applicators and programmers, it is desirable to read and write only one RFID label within a group of labels located in close proximity to each other. For example, on a label applicator machine, labels are packaged on a reel to facilitate processing on the machine. On the reel, the labels are placed side-by-side or end-to-end in close proximity. However, it is difficult for a traditional UHF antenna to direct energy to only one label at a time, due to the fact that the traditional UHF antenna generally has a broad radiation pattern and directs energy well into the far field. The broad radiation pattern illuminates all RFID labels within the range of the antenna. If an attempt is made to write the product code or serial number to one label, all illuminated labels are programmed with the same code or serial number.

A traditional far-field radiating antenna used in such RFID UHF applications is a patch antenna. Usually the patch area which radiates is fed through a connector energized by RFID electronics. Typically a conducting plate is mounted on the backside and spaced a small distance from the patch area.

For those applications mentioned above where it is desirable to read or write information to an RFID label at very close distances, such as label applicators where one label at a time needs to be programmed, tested, and applied, traditional far field antennas perform poorly. Traditional radiating antennas require that tagged items be separated by substantial distances in order to prevent multiple items from being read or programmed simultaneously or require usage of metal windows to shield all labels except the label being programmed or read.

However, such techniques do not adequately solve the problem because if the labels are spaced further apart, the applicator throughput is lowered and the number of labels in a given reel size is limited. If shield techniques are used, a different shield is required for each different label shape and spacing. Therefore, changes are required to process different labels on an applicator line, also effectively lowering throughput.

SUMMARY

The present disclosure relates to a near field antenna which is configured to read an RFID label. The antenna is configured such that a localized electric E field emitted by the antenna at an operating wavelength resides substantially within a zone defined by the near field. The localized E field directs a current distribution along an effective length of the antenna corresponding to a half-wave to a full-wave structure. In one embodiment, the antenna is configured such that the near field zone is defined by a distance from the antenna equal to λ/2π where λ is the operating wavelength of the antenna. In another embodiment, the near field antenna operates at a frequency of about 915 MHz such that the near field zone distance is about 5 cm.

The present disclosure also relates to a method of reading an RFID label comprising the steps providing a near field antenna assembly configured such that a localized electric E field emitted by the antenna assembly at an operating wavelength resides substantially within a zone defined by the near field wherein the localized E field directs a current distribution along an effective length of the antenna corresponding to a half-wave to a full-wave structure. The method also includes the step of coupling the localized electric E field of the near field antenna assembly to an RFID label disposed within the near field zone In one embodiment, the method further includes the step of configuring the antenna assembly such that the near field zone is defined by a distance from the antenna assembly equal to λ/2π where λ is the operating wavelength of the antenna assembly. In addition, the method may include the step of operating the antenna assembly at a frequency of about 915 MHz such that the near field zone distance is about 5 cm.

The present disclosure also relates to a near field antenna assembly for reading an RFID label which includes an antenna configured as a single and continuous conductor. The antenna extends from one end forming a feed point to another end forming a termination point. The termination point is connected to a ground plane through a resistor. The antenna assembly includes a relative dielectric constant and is configured such that a localized electric E field emitted by the antenna at an operating wavelength resides substantially within a zone defined by the near field. The localized E field directs a current distribution along an effective length of the antenna corresponding to a half-wave to a full-wave structure.

In one embodiment, the effective length of the antenna assembly is such that the current distribution directed through the antenna causes a waveform having a wavelength proportional to nv/f where v is the propagation wave velocity equal to the speed of light divided by the square root of the relative dielectric constant of the antenna assembly, f is the frequency in Hz, and n ranges from about 0.5 for a half-wavelength to 1.0 for a full-wavelength. In another embodiment, the antenna is a microstrip trace antenna and the near field antenna assembly includes a substrate having a first surface and a second surface and a thickness defined therebetween wherein the microstrip trace antenna is disposed upon the first surface of the substrate and the ground plane is disposed upon the second surface of the substrate.

In another embodiment, the antenna assembly is configured such that the localized electric E field propagated by the antenna assembly couples to an RFID label that is oriented lengthwise along the effective length of the antenna assembly.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

The present disclosure will be understood more fully from the detailed description given below and from the accompanying drawings of particular embodiments of the invention which, however, should not be taken to limit the invention to a specific embodiment but are for explanatory purposes.

Numerous specific details may be set forth herein to provide a thorough understanding of a number of possible embodiments of the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments disclosed herein are not necessarily limited in this context.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
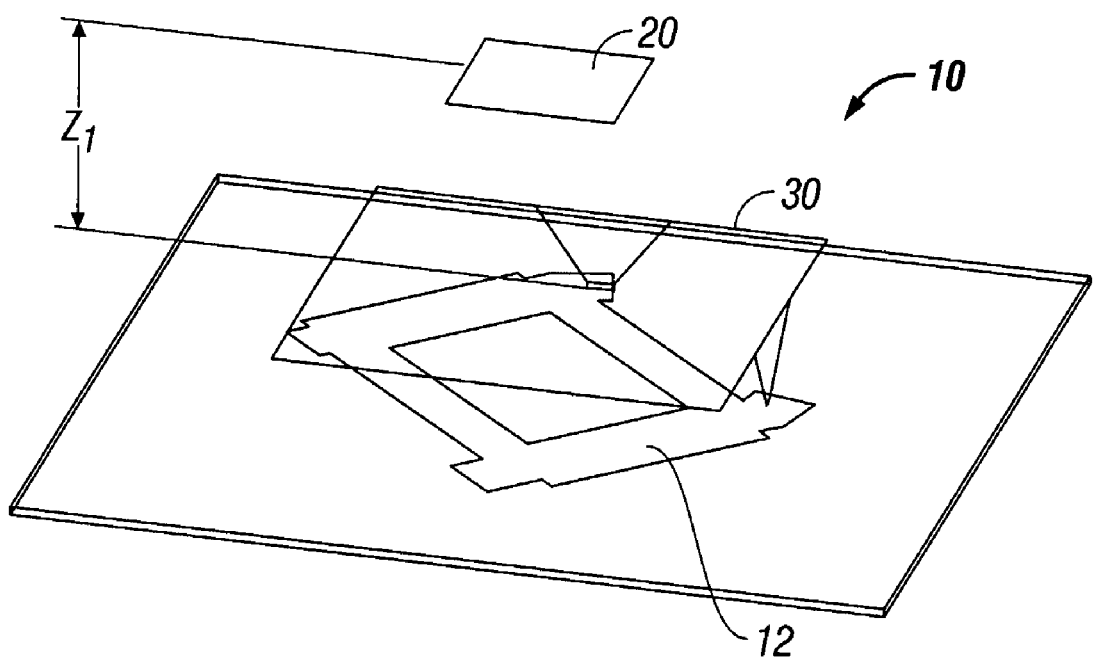
FIG. 1 illustrates a perspective view of a patch radiating antenna assembly with a RFID label at a distance according to the prior art.

Turning now to the details of the present disclosure, FIG. 1 shows a patch radiating antenna assembly 10 which includes a patch antenna 12 with a RFID label 20 depicted at a distance. The patch antenna E field component along the dipole orientation of the RFID label 20 energizes the RFID label 20 and allows the information on the RFID label 20 to be read at a distance d equal to Z1 away from the antenna assembly 10, where Z1 is much greater than $\lambda/2\pi$, where $\lambda$ is the wavelength.

Typically the patch antenna 12, which is a radiating antenna, is designed so that the antenna impedance is essentially real and mostly consists of the radiation impedance. The value of the real impedance essentially matches the signal source impedance from the feed system, which is typically 50 ohms. The antenna impedance is mostly real and is mostly the radiation resistance. The present disclosure relates to a near field antenna assembly which intentionally reduces the radiation in the far field and enhances the localized electric E field in the near field regions. More particularly, such a near field antenna assembly limits energy to the region close to the antenna, i.e., the near field zone, and prevents radiation in the far-field zone. Thus, RFID labels physically close to the near field antenna are interrogated but not those located outside the near-field zone. In the case of an operating frequency of 915 MHz, the near-field zone is approximately 5 cm from the antenna. Labels outside the 5 cm range are not read or written to.

Although commonly referred to in the craft as an antenna, as used herein, an antenna assembly is defined as an assembly of parts, at least one of which includes an antenna which directly transmits or receives electromagnetic energy or signals.

Figure 2:
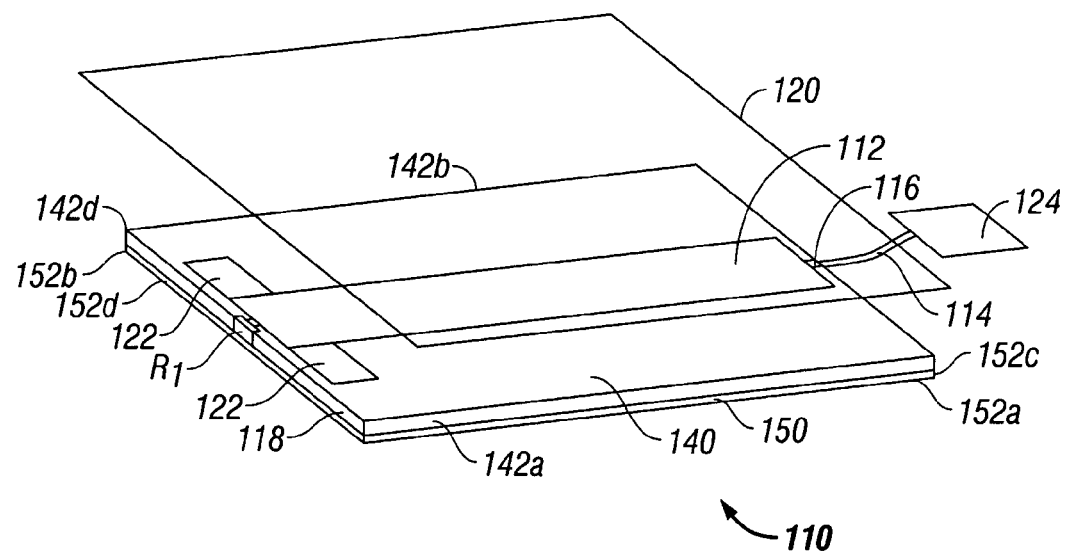
FIG. 2 illustrates a top perspective view of one embodiment of a linear monopole microstrip antenna assembly according to the present disclosure with a large RFID label overhead.
Figure 3:
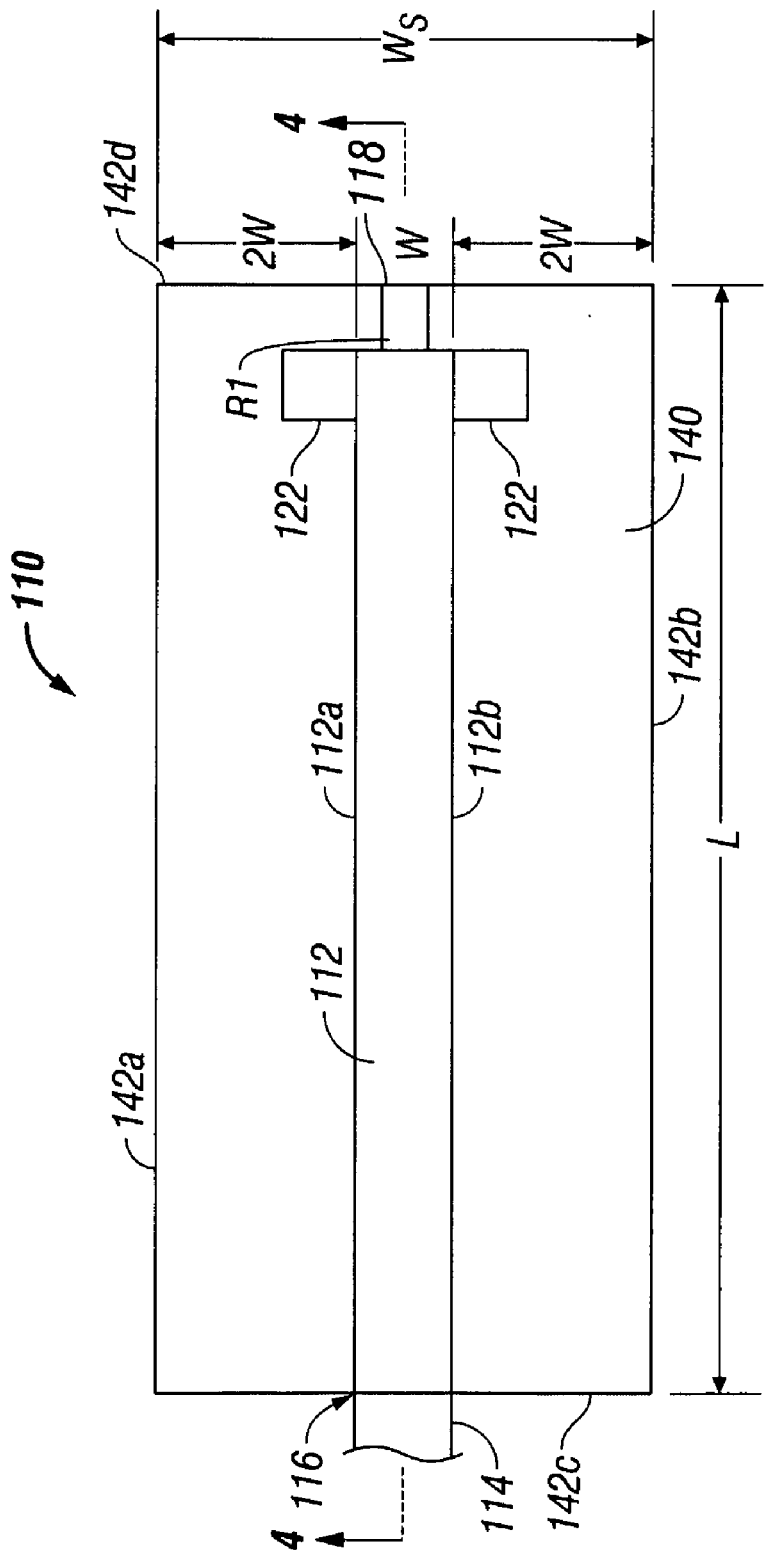
FIG. 3 is a plan view of the linear antenna assembly of FIG. 2.
Figure 4:
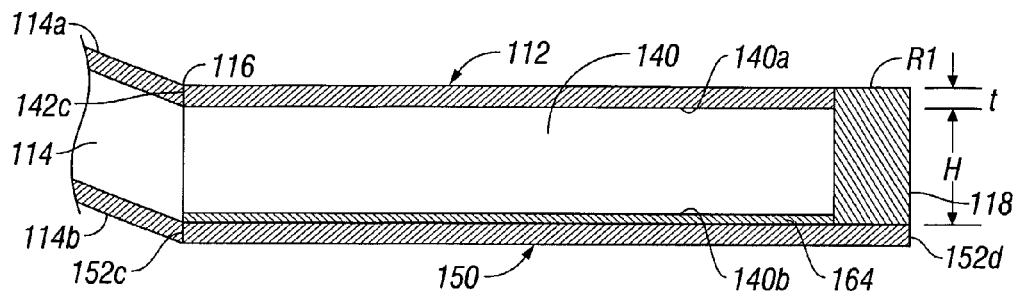
FIG. 4 is a cross-sectional elevation view taken along line 4-4 of FIG. 3.

In one embodiment of the present disclosure, FIG. 2 shows a near field antenna assembly 110 which includes a trace linear element microstrip antenna 112 with a large RFID label 120 in proximity overhead. As also illustrated in FIGS. 3 and 4, the near field antenna assembly 110 includes a microstrip antenna 112 having a thickness "t" and which is electrically coupled to a cable 114, which is typically, but not limited to, a coaxial cable, at a feed point end 116 and terminated into a typically 50 ohm terminating resistor "R1" at an opposite or termination end 118. The cable 114 has a first or signal terminal 114a and a second or reference to ground terminal 114b. A signal is fed at the feed point end 116 from the cable 114 via a feed system 124. The signal is typically 50 ohms.

In one embodiment, a capacitive matching patch 122 (FIG. 3) may be electrically coupled to the linear antenna 112 at the 50 ohm termination end 118 for impedance matching, typically to minimize reflections.

As best illustrated in FIGS. 3 and 4, the linear microstrip assembly 110 includes the substantially rectangular microstrip trace 112 with a substrate 140 having a first surface 140a and a second surface 140b opposing thereto. A distance between the first and second surfaces 142, 144, respectively, defines a thickness "H" of the substrate 140.

The microstrip assembly 110 also includes a ground plane 150 and is configured so that the microstrip line 112 is disposed upon the first surface 140a of the substrate 140 and the ground plane 150 is disposed upon the second surface 140b of the substrate 140. In one embodiment, the ground plane 150 is separated from the second surface 140b via a dielectric spacer 164, which may be an air gap (appropriate structural supports are not shown). The first terminal 114a of the cable 114 is electrically coupled to the microstrip antenna 112 while the second terminal 114b is electrically coupled to the ground plane 150.

In one embodiment, the linear microstrip line 112 is substantially rectangular and has a width "W". Length "L" of the antenna assembly 110 extends from the feed point 116 to and including the terminating resistor "R1". The linear microstrip line 112 is typically a thin conductor, such as, but not limited to, copper. The thickness "t" typically ranges from about 10 microns to about 30 microns for frequencies in the range of UHF.

The substrate 140 is a dielectric material, which typically may include a ceramic or FR-4 dielectric material, having a thickness "H" and an overall width "$W_s$", with the ground plane 150 disposed underneath. At the termination end 118 of the linear microstrip 112, the terminating resistor R1 electrically couples the end 118 of the linear microstrip line 112 to the ground plane 150.

The input impedance "Z" of the linear microstrip antenna 112 at the feed point 116 is designed to be roughly equal to the characteristic impedance of the cable 114 supplying the feed signal in order to maximize power coupling from the reader. (The reader is part of the feed system 124 and is the electronics system separate from the cable 114 or transmission network. The antenna assembly 110 couples to the reader system through the cable 114.) The ratio W/H is typically greater than or equal to one, and may specifically range from about 1 to about 5.

In this case the input impedance "Z" in ohms of the linear microstrip antenna assembly 110 is given by the following equation:

$$Z = \frac{120\pi}{\sqrt{\varepsilon_{re}}} \left[ \frac{W}{H} + 1.393 + 0.667 \ln\left(\frac{W}{H} + 1.444\right) \right]^{-1} \quad (1)$$

where $$\varepsilon_{re} = \left(\frac{\varepsilon_r + 1}{2}\right) + \left(\frac{\varepsilon_r - 1}{2}\right)\left(1 + \frac{12H}{W}\right)^{-\frac{1}{2}} \quad (2)$$

and "$\varepsilon_r$" is the relative dielectric constant for the substrate 140. So, the microstrip width W and substrate height H mainly determine the impedance "Z".

In one embodiment, the substrate relative dielectric constant "$\varepsilon_r$" ranges from about 2 to about 12. In another embodiment, the length "L" of the linear microstrip near-field antenna assembly 110 corresponds to an equivalent or effective length of a half-wave to a full-wave device with an equivalent physical length approximately from $$L = n \frac{c}{f\sqrt{\varepsilon_{re}}},$$

where "c" is the speed of light (about $3 \times 10^8$ m/s), "f" is the operating frequency in Hz, and "$\varepsilon_r$" is the substrate relative dielectric constant, and "n" ranges from about 0.5 for an equivalent half-wave dipole antenna to about 1.0 for an equivalent full-wave dipole antenna.

In one embodiment, the terminating resistor "R1" is adjusted so that the input impedance at the feed point 116 is approximately 50 ohms or the feed cable 114 characteristic impedance.

In another embodiment, the linear microstrip antenna 112 has first and second lengthwise edges 112a and 112b and the microstrip antenna 112 is substantially centered on the substrate 140 and ground plane 150 such that lengthwise side edges 142a and 142b of the substrate 140 and lengthwise side edges 152a and 152b of the ground plane 150 each extend a distance of at least twice the width "W" ("2W") from the first and second lengthwise edges 112a and 112b. As a result, the substrate 140 and the ground plane 150 each have a total width "$W_s$" of at least five times "W" ("5W"). The substrate 140 further includes transverse side edge 142c at which the feed point 116 is disposed and transverse side edge 142d at which the terminating resistor R1 is disposed. Similarly, the ground plane 150 further includes transverse side edge 152c at which the feed point 116 is disposed and transverse side edge 152d at which the terminating resistor "R1" is disposed.

The near field antenna assembly 110 intentionally reduces the far field and enhances the near field regions. More particularly, the near field RFID antenna assembly 110 includes the element antenna 112 configured such that a localized electric E field emitted by the antenna 112 resides substantially within a zone defined by the near field and a radiation field emitted by the antenna 112 resides substantially within a zone defined by a far field with respect to the antenna 112. Thus, the near field antenna assembly 110 has many advantages for regulatory purposes. The real impedance of such an antenna assembly without the 50 ohm terminating impedance is very low. Thus, the radiation resistance is low. A typically 50 ohm terminating impedance R1 is added so that the input impedance is nearly 50 ohm to match the feed system 124 which supplies power via the cable 114. This configuration and operational method also results in a very low antenna "Q" factor, which makes the antenna broadband.

Figure 5:
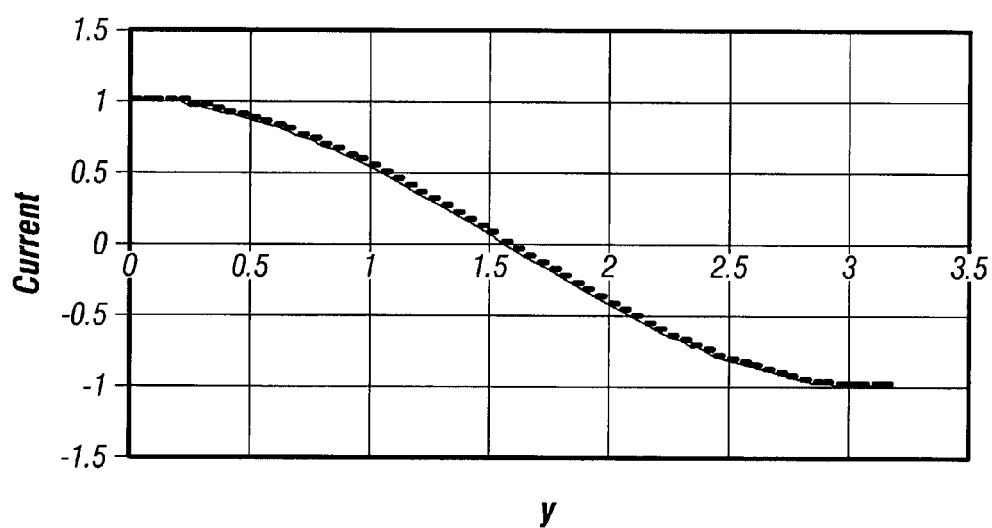
FIG. 5 is a graphical representation of the current along a linear microstrip antenna trace of the antenna assembly of FIGS. 3 and 4.

Ideally, the microstrip antenna 112 is a half wave, "λ/2", antenna with the current distribution along the length of the trace microstrip antenna 112 as shown in FIG. 5.

At the feed point 116, the current peaks and is essentially in phase with the applied voltage from the feed system 124. The current decreases to zero at the midpoint of the microstrip antenna 112 and then continues to decrease to a negative peak at the termination end 118.

As illustrated in FIG. 5, such a current distribution linear microstrip antenna assembly 110 operating in a half-wave dipole configuration creates a positive E field at the feed end 116 and a negative E field at the termination end 118.

Figure 6:
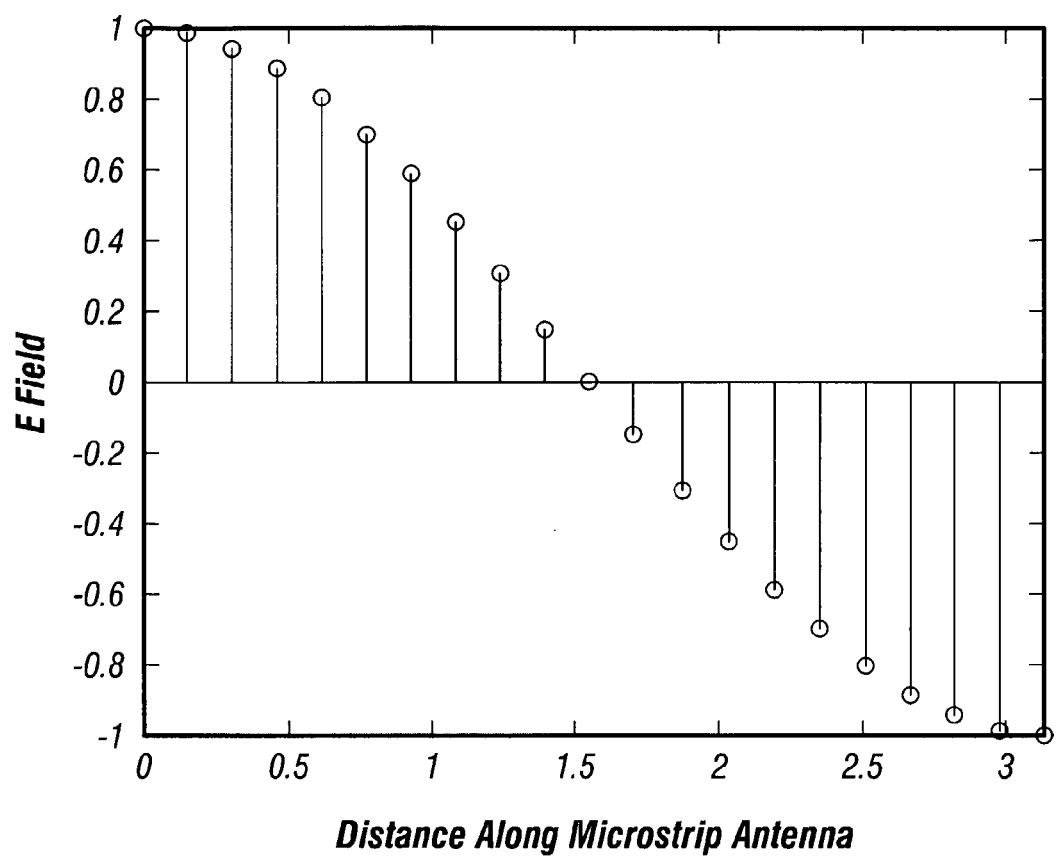
FIG. 6 is a graphical representation of a half-wave electric field (E-field) distribution above the linear antenna assembly of FIG. 4.

FIG. 6 illustrates the coupling of the near-field E field above the near-field microstrip antenna 112. More particularly, FIG. 6 is a graphical plot of the normalized time-varying E field above the microstrip antenna 112 for the half-wave length case for an instant in time. At the feed point 116, the E field is at a maximum. At the midpoint of the microstrip antenna 112, the E field decreases to zero. At the termination end 118, the E field decreases to a negative peak or minimum. As the RFID label 120 is placed just above such an antenna (see FIG. 2), the differential E field from the microstrip antenna 112 drives or directs a current along the length of the RFID label antenna 120 and thus activates the RFID label 120 so that it can then be read or written to by the RFID reader, i.e., the near-field antenna assembly 112.

As a result, the RFID label 120 being positioned over the microstrip antenna 112 and oriented along the length "L" of the microstrip antenna assembly 110 then communicates information to the microstrip antenna 112. It should be noted that depending upon the material of the substrate 140, the substrate 140 effectively creates a slow wave structure resulting in an overall antenna length "L" which is $$l = \frac{c}{2f\sqrt{\varepsilon_r}}.$$

where "c" is the speed of light in vacuum, "f" is the operating frequency, and "$\varepsilon_r$" is the relative permittivity or relative dielectric constant of the substrate material for a half-wave dipole antenna configuration. Thus, as the relative permittivity or relative dielectric constant "$\varepsilon_r$" of the substrate 140 increases, the overall antenna assembly length "L" decreases so that such an antenna assembly may be used for a smaller RFID label. For example, using a ceramic substrate with dielectric constant of 12.5, an overall microstrip length of 4.7 cm. was achieved experimentally with a theoretical length of 4.6 cm. The smaller antenna assembly is useful for reading or detecting smaller item level RFID labels.

Figure 7:
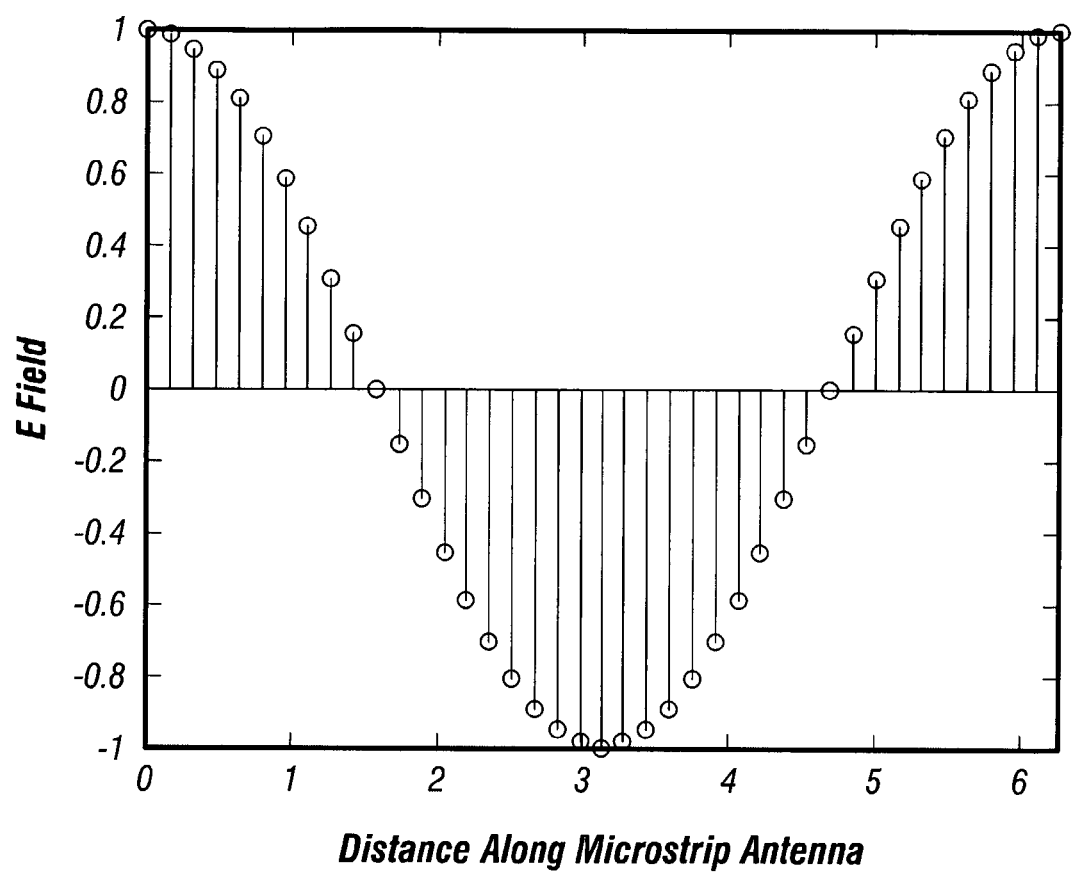
FIG. 7 is a graphical representation of a full-wave E-field distribution above the linear antenna assembly of FIG. 4 at 0° phase.
Figure 8:
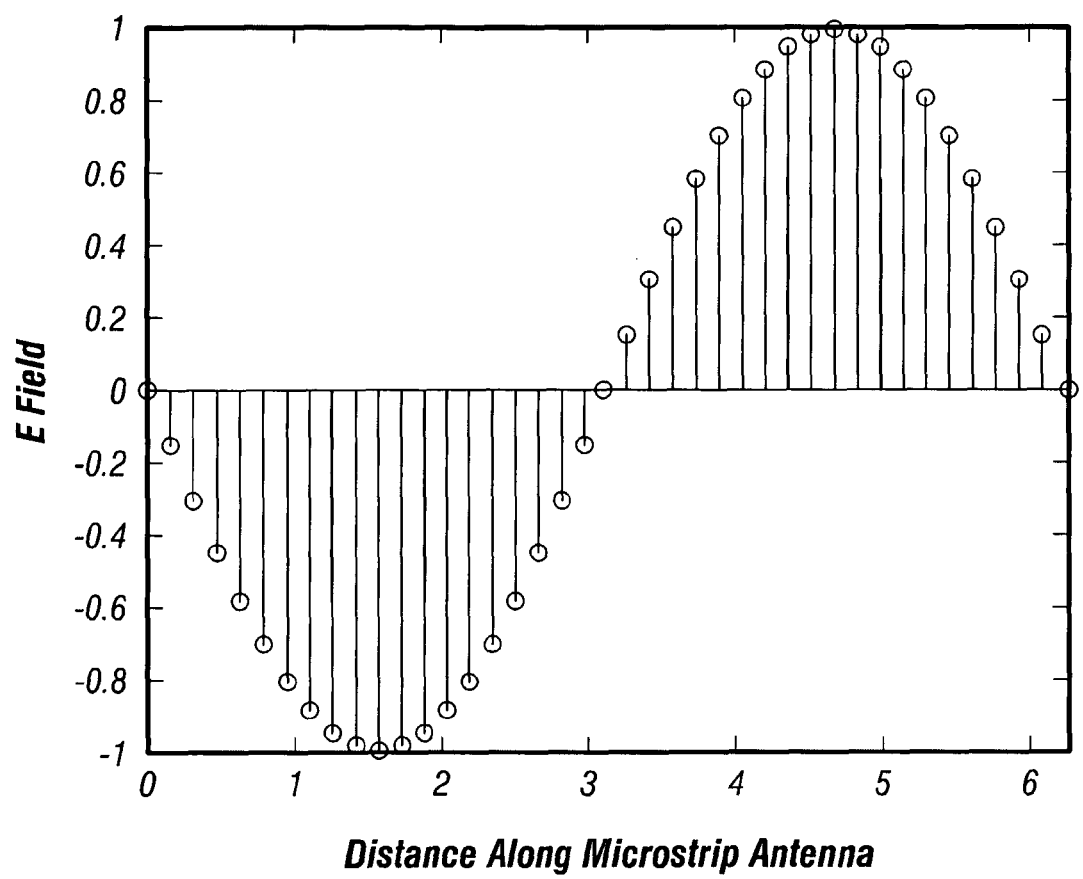
FIG. 8 is a graphical representation of a full-wave E-field distribution above the linear antenna assembly of FIG. 4 at 90° phase.

In one embodiment, the length of the linear microstrip antenna assembly 110 is extended to a length corresponding to a full-wave. FIGS. 7 and 8 show the time-varying E field at an instant in time above a full wave microstrip antenna assembly, for example linear microstrip antenna assembly 110, at zero and 90 degree phase respectively.

As the feed signal supplied via cable 114 at feed point 116 passes through a full 360 degree phase, two particular snapshots at the instant in time of the differential E fields can be observed. At zero phase, there are two pairs of differential E fields while at 90 degree phase there is only one pair. The actual differential E field that couples to the RFID label 120 above sweeps along the length "L" of the linear microstrip antenna 112. This is advantageous in terms of alignment between the linear microstrip antenna 112 and the RFID label 120. Increasing the dielectric strength (or relative permittivity "$\varepsilon_r$") of the material of the substrate 140 compensates at least partially for a need to increase overall antenna length "L".

Figure 9:
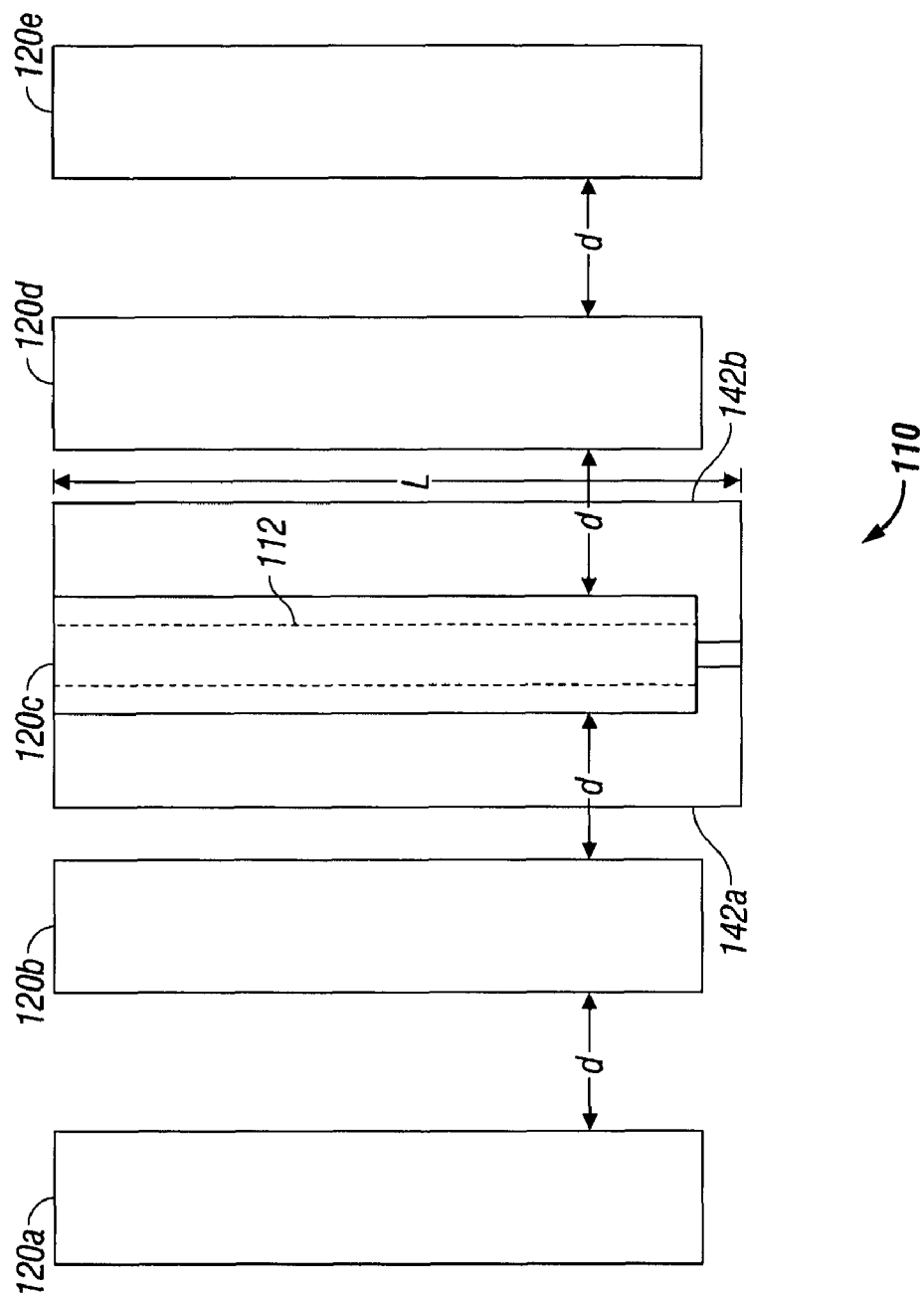
FIG. 9 is a plan view of the linear antenna assembly of FIG. 4 with RFID labels oriented along the length of the linear antenna assembly and spaced apart by a gap.

Referring to FIG. 9, a series of RFID labels 120a to 120e are spaced apart by a gap distance "d" with one of the RFID labels 120c positioned over a single linear microstrip antenna assembly 110. The RFID labels 120a to 120e are oriented such that the antenna dipoles of the RFID labels 120a to 120e are oriented lengthwise along the length "L" of the linear microstrip antenna assembly 110.

To prevent the near-field linear microstrip antenna assembly 110 from reading or writing to a label 120b or 120d which is nearby to the label 120c being addressed, the microstrip width "W", length "L", and overall substrate width "$W_s$" may be adjusted accordingly. As the gap "d" between the RFID labels 120a to 120e is reduced, the microstrip width "W" must be reduced along with the overall substrate width "$W_s$," of about "5W". The size of the gap "d" positions the adjacent labels 120a, 120b, 120d, 120e well beyond the lateral side edges 142a, 142b of the substrate 140 of the linear microstrip antenna 112, so that the microstrip antenna assembly 110 does not detect the presence of adjacent RFID labels 120a, 120b, 120d, 120e. The trace width W, length L, and substrate parameters W/H and $\varepsilon_r$ are adjusted so that a current distribution is achieved effectively corresponding to a half-wave to a full-wave structure.

Figure 10:
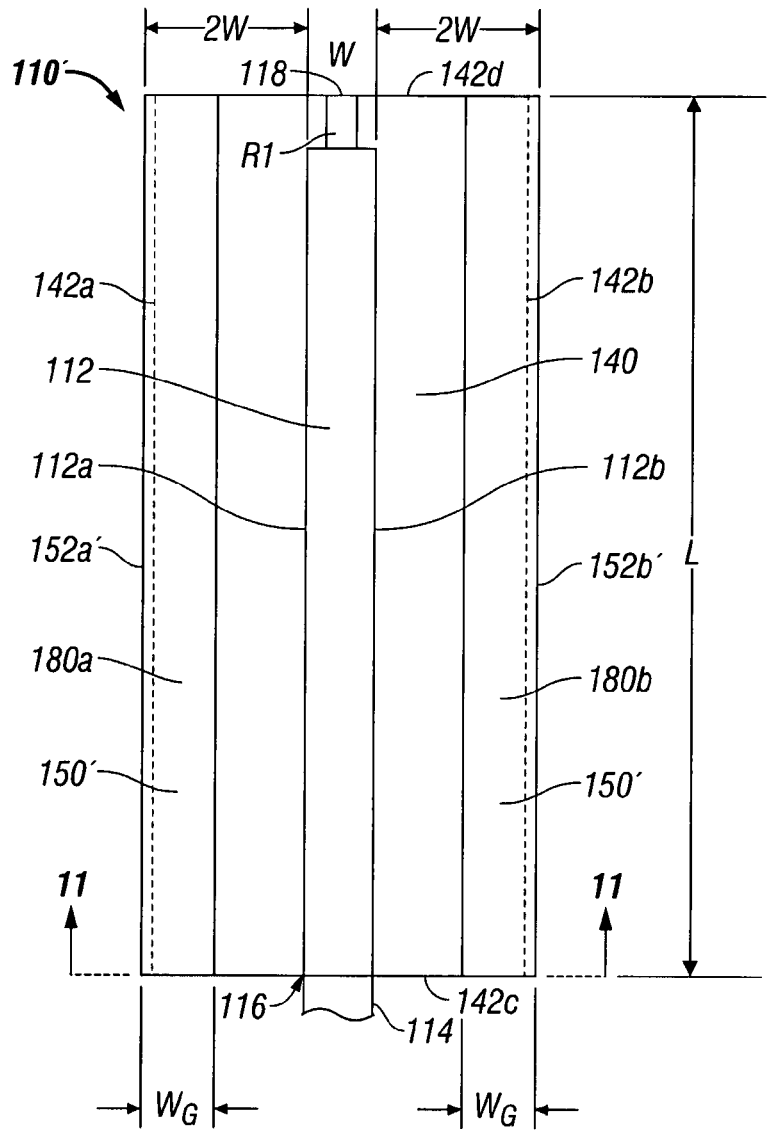
FIG. 10 is a plan view of one embodiment of the linear monopole microstrip antenna assembly having an extended ground plane according to the present disclosure.
Figure 11:
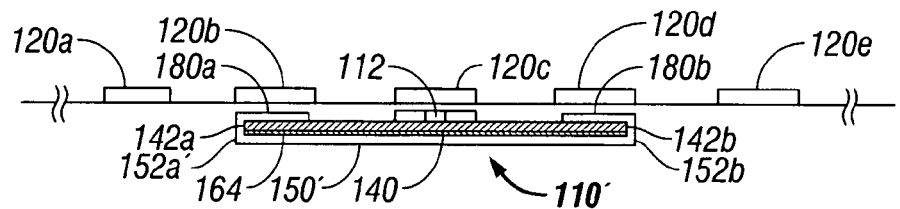
FIG. 11 is a cross-sectional end elevation view taken along line 11-11 of FIG. 10.

In one embodiment shown in FIGS. 10 and 11, a linear microstrip antenna assembly 110' includes an extended or wrap-around ground plane. More particularly, the linear microstrip antenna assembly 110' is the same as linear microstrip 110 except that in place of ground plane 150, the microstrip line 112 is disposed upon the first surface 140a of the substrate 140 and a ground plane 150' is disposed upon at least a portion of the first surface 140a of the substrate 140 and not in contact with the microstrip line 112. The ground plane 150' is disposed also on the first and second edges 142a, 142b of the substrate 140, respectively, and on the second surface 140b of the substrate 140. Ground plane 150' may also be separated from the second surface 140b via dielectric spacer 164.

Ground plane 150' may also include flaps or end portions 180a and 180b which overlap the first surface 140a and extend inwardly a distance "$W_G$" towards the edges 112a and 112b, respectively, but do not contact the trace microstrip 112.

Figure 12:
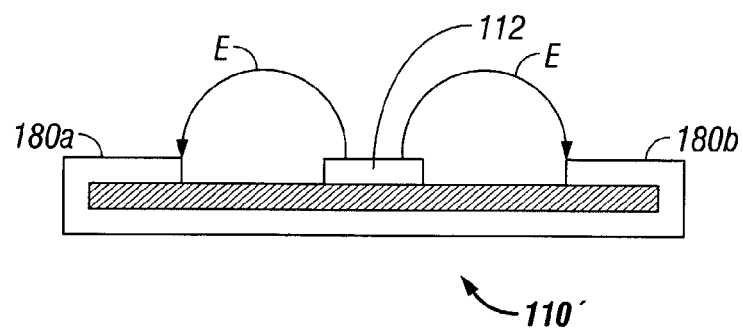
FIG. 12 is an end view of the antenna assembly of FIG. 10 showing distribution of the electric field.

As illustrated in FIG. 11, the RFID labels 120a to 120e may be disposed over the antenna assembly 110' in close proximity such that while one label 120c resides over the trace linear microstrip 112, adjacent labels 120b and 120d reside generally over the flaps or end portions 180a and 180b, respectively, of the ground plane 150'. As illustrated in FIG. 12, the antenna assembly 110' controls the location of the radiofrequency energy by propagating near field energy and by the ground plane 150' wrapping around via the flaps or end portions 180a and 180b extending inwardly the distance $W_G$ towards the edges 112a and 112b, respectively, but not contacting the trace microstrip 112. Therefore, the E-fields extend substantially only from the trace microstrip 112 to the flaps or end portions 180a and 180b, thereby effectively terminating the E-fields and preventing coupling of the antenna assembly 110' to the adjacent labels 120b and 120d.

Figure 13:
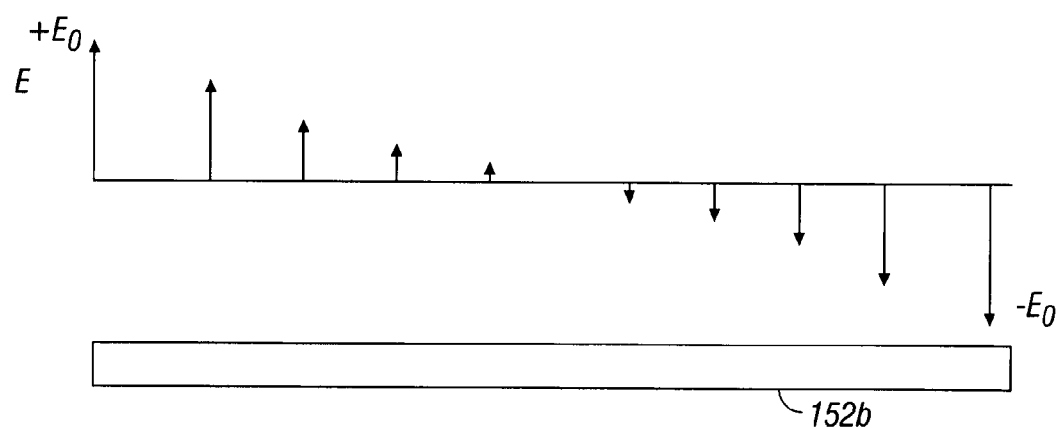
FIG. 13 is a side view of the antenna assembly of FIG. 10 shown distribution of the electric field.

FIG. 13 illustrates an instantaneous view of the coupling of the time-varying electric near field E above the near-field microstrip antenna 112 of antenna assembly 110' as viewed from one of the side edges such as side edge 152b of the ground plane 150' of the antenna assembly 110'. More particularly, FIG. 13 is a graphical plot of the normalized E field for the half-wave length case. In a similar manner as illustrated in FIG. 6, at the feed point 116, the E field is at a maximum. At the midpoint of the microstrip antenna 112 along the length "L", the E field decreases to zero. At the termination end 118, the E field decreases to a negative peak or maximum.

As the RFID label 120 is placed just above the antenna assembly 110' as illustrated in FIG. 12, the differential E field from the microstrip antenna 112 drives or directs a current along the length of the RFID label antenna 120 and thus activates the RFID label 120 so that it can then be read or written to by the RFID reader, i.e., the near-field antenna assembly 112. As a result, the RFID label 120c being positioned over the microstrip antenna 112 and oriented along the length L of the microstrip antenna assembly 110' also couples well to the microstrip antenna 112. Again, the trace width W, length L, and substrate parameters W/H and $\in_r$ are adjusted so that an effective current distribution is achieved effectively corresponding to a half-wave to a full-wave structure.

Figure 14:
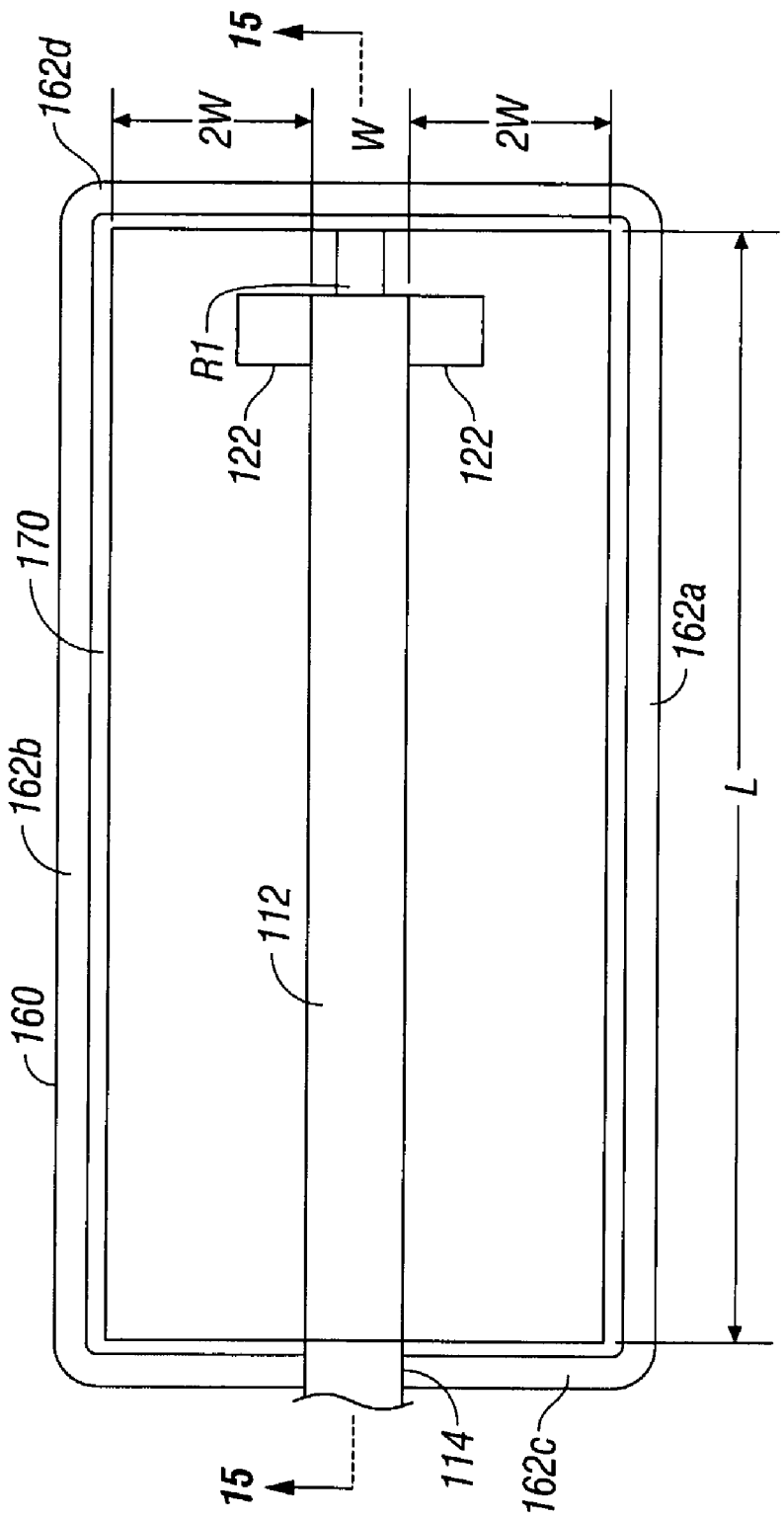
FIG. 14 is a plan view of one embodiment of the linear monopole microstrip antenna assembly having a conductive housing according to the present disclosure.
Figure 15:
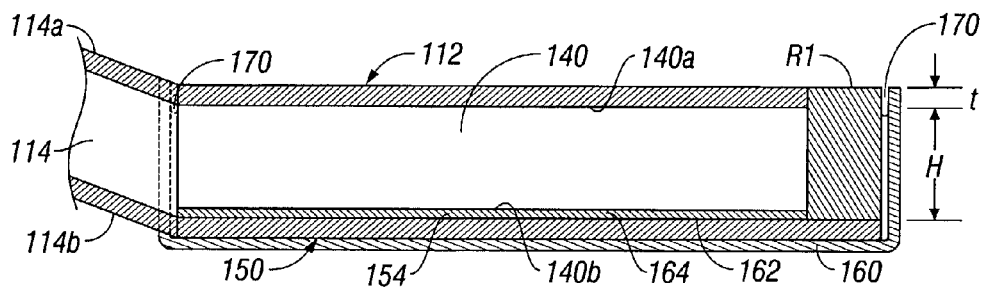
FIG. 15 is a cross-sectional end elevation view taken along line 15-15 of FIG. 14.

In one embodiment, referring to FIGS. 14 and 15, the linear microstrip antenna assembly 110 (or 110') may be mounted in or on a conductive housing 160. The conductive housing 160 includes a base 162 and typically two lengthwise side walls 162a and 162b, and two transverse side walls 162c and 162d connected, typically orthogonally, thereto. A bottom surface 154 of the ground plane 150 is disposed on the base 162 so as to electrically couple the conductive housing 160 to the ground plane 150. The conductive housing 160 is therefore grounded via the ground plane 150.

The walls 162a to 162d may be separated from the edges 142a to 142d of the substrate 140. The edges 142a to 142d may contact the conductive housing 160 but a space tolerance may be necessary to fit the antenna assembly 110 (or 110') into the housing 160. The walls 162a to 162d also may be separated from the linear microstrip antenna 112 via a dielectric spacer material 170 so that the conductive housing 160 is electrically separated from the linear microstrip antenna 112, the capacitive load 122 and the terminating resistor R1. The dielectric spacer material may include an air gap. The material of the conductive housing 160 may include aluminum, copper, brass, stainless steel, or similar metallic substance. It is envisioned that the addition of the conductive housing 160 with extended side surfaces effected by side walls 162a to 162d adjacent to the side edges 142a to 142d of the substrate 140 of the microstrip antenna assembly 110 may further reduce undesired coupling of adjacent RFID labels 120 with the linear microstrip antenna assembly 110.

Figure 16:
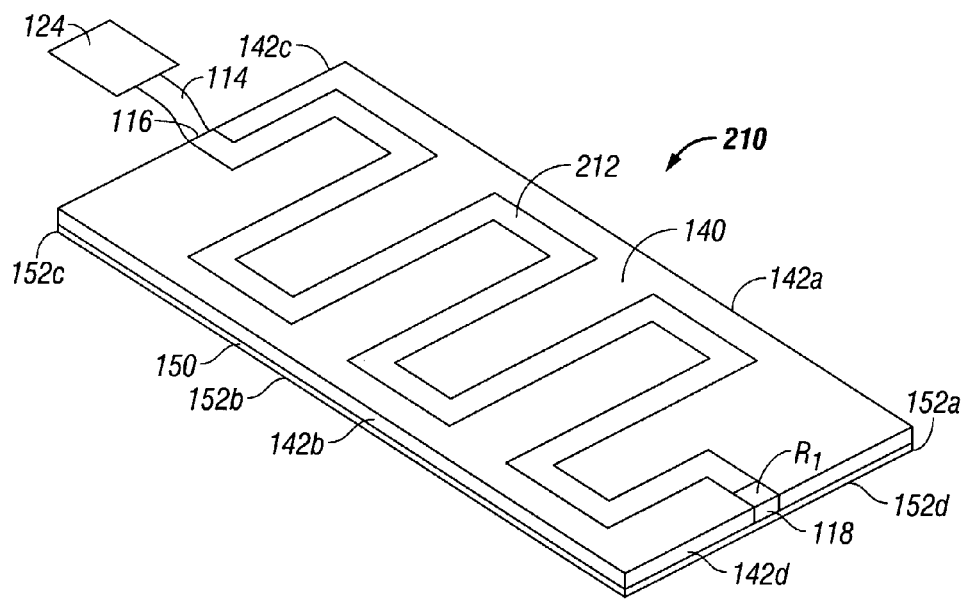
FIG. 16 is a top perspective view of one embodiment of a meanderline monopole microstrip antenna assembly according to the present disclosure.
Figure 17:
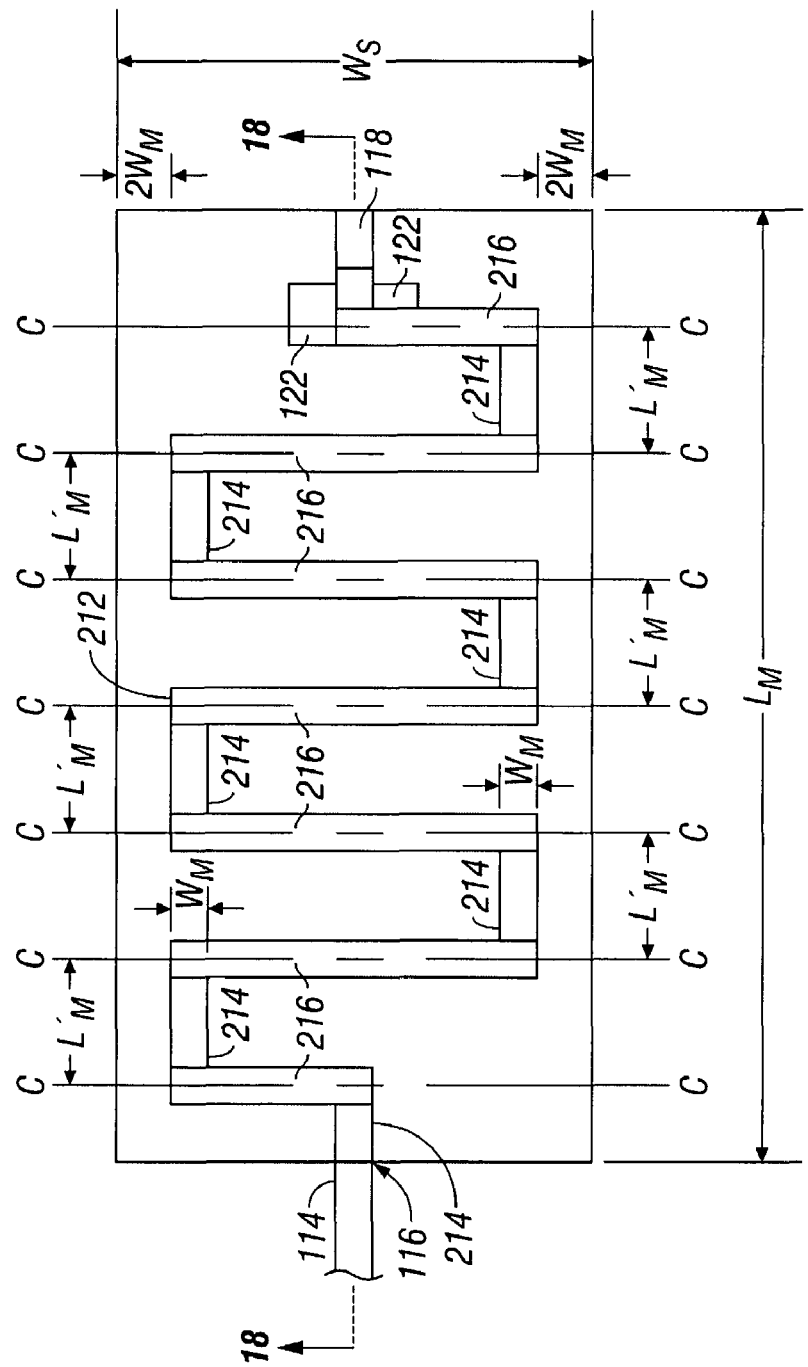
FIG. 17 is a top plan view of the meanderline antenna assembly of FIG. 16.
Figure 18:
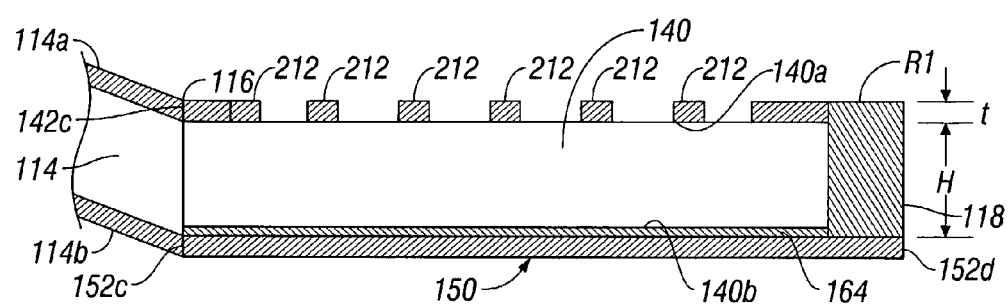
FIG. 18 is a cross-sectional elevation view taken along line 18-18 of FIG. 17.

In one embodiment of the present disclosure shown in FIGS. 16-18 a meanderline element microstrip antenna assembly 210 is used to make the apparent antenna length "L" longer for a given overall antenna size, as applied, for example, to reading a small RFID label. Meanderline antenna assembly 210 is similar in many respects to linear element microstrip antenna assembly 110 and thus will only be described herein to the extent necessary to identify differences in construction and operation.

More particularly, FIGS. 16-18 show near field antenna assembly 210 which includes a meanderline-like element microstrip antenna 212. The meanderline-like antenna trace 212 "meanders" across the width "$W_s$" of the substrate 140 as it proceeds along the length "L" from the feed point 116 to the terminating resistor R1 at the termination end 118. The meanderline-like microstrip antenna trace 212 has thickness "t" and is electrically coupled to cable 114 at feed point end 116 and terminated into the typically 50 ohm terminating resistor R1 at termination end 118.

The meanderline-like microstrip antenna 212 differs from linear microstrip antenna 112 in that the meanderline-like microstrip antenna 212 directs current in two dimensions. More particularly, the meanderline-like microstrip assembly 210 includes, in one embodiment, a multiplicity of alternating orthogonally contacting conducting segments 214 and 216, respectively, configured in a square wave pattern forming the meanderline-like microstrip trace antenna 212. Conducting segments 214 are linearly aligned with length "$L_M$" and substantially parallel to at least one of the lengthwise side edges 142a and 142b of the substrate 140. Conducting segments 216 are transversely aligned to and in contact with the linearly aligned conducting segments 214 to form the square wave pattern. The conducting segments 216 each are oriented with respect to centerline axis C-C extending along the length $L_s$ of the conducting segment and bisecting the width. The contacting conducting segments 214 and 216 may be integrally formed of a unitary microstrip trace. The meanderline-like antenna 212 may be formed in other patterns not conforming to a square wave pattern wherein the alternating contacting conducting segments 214 and 216 are not orthogonal The embodiments are not limited in this context. The configuration of the segments 214 and 216 enables a localized electric E field to drive or direct current in two dimensions.

Substrate 140 has at least one edge 142a, 142b having length "$L_M$" and the orthogonally contacting conducting segments 214, 216 are disposed in an alternating transverse and longitudinal orientation with respect to the at least one edge 142a, 142b.

As illustrated in FIG. 17, the conducting segments 214 are disposed in a longitudinal orientation and which together define the overall length "$L_M$" of the meanderline-like microstrip trace 212 extending from the feed point 116 to and including the terminating resistor R1 at the termination end 118. A width "$W_M$" of the meanderline-like trace 212 is defined as a width of one of the longitudinally oriented conducting segments 214.

Similar to linear microstrip antenna assembly 110, the length "$L_M$" of the meanderline-like microstrip assembly 210 has an overall dimension ranging from substantially equal to a length of an equivalent half-wave dipole antenna to a length of an equivalent full-wave dipole antenna length. The resulting electric field (E-field) distributions are the same as illustrated in FIGS. 6-8, as described for the linear antenna assembly 110.

In one embodiment, the meanderline-like microstrip antenna assembly 210 has a ratio of "$W_M/H$" may be greater than or equal to one and may specifically range from about 1 to about 5. The substrate 140 may have a relative dielectric constant ranging from about 2 to about 12. At least one edge 142a, 142b of the substrate 140 may be configured to extend transversely from the conducting segments 214 disposed in a longitudinal orientation a distance substantially equal to or greater than two times the width "$W_M$" ("2 $W_M$") of the meanderline-like microstrip trace 212. In another embodiment, at least one edge 152a, 152b of the ground plane 150 extends transversely from the conducting segments 214 disposed in a longitudinal orientation a distance substantially equal to or greater than the width "$W_M$" of the meanderline-like microstrip trace 212. It is also envisioned that the meanderline-like antenna assembly 210 may include capacitive load 122 electrically coupled to the meanderline-like microstrip trace 212, typically in proximity to the terminating resistor R1.

Figure 19:
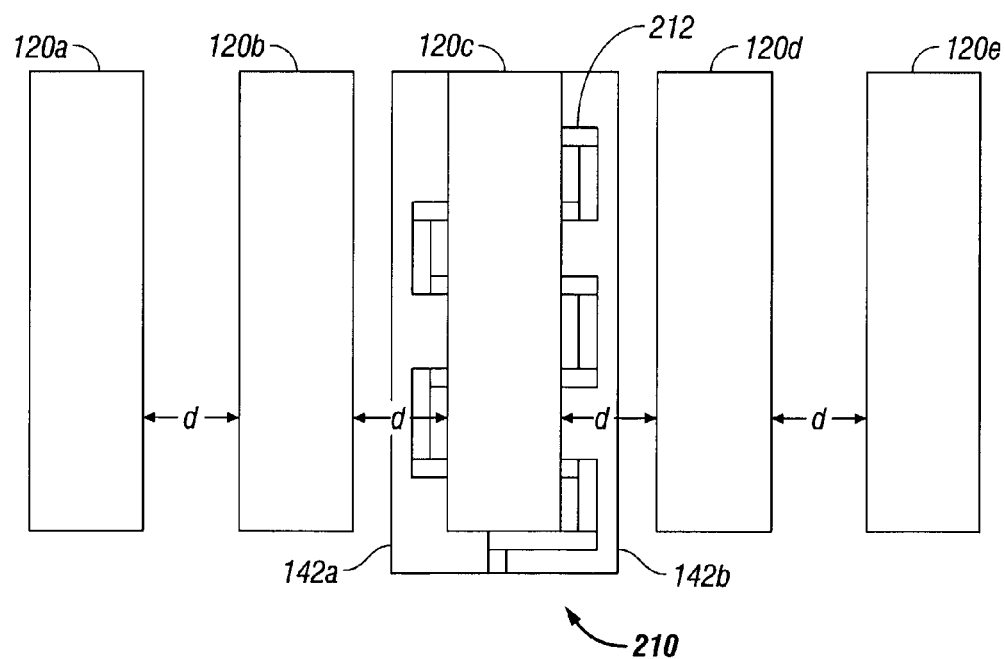
FIG. 19 is a plan view of the meanderline antenna assembly of FIG. 17 with RFID labels oriented along the length of the meanderline antenna assembly and spaced apart by a gap.

As illustrated in FIGS. 17-19, (and described in a manner similar to linear antenna assembly 110 illustrated in FIG. 9, the series of RFID labels 120a to 120e are spaced apart by a gap distance "d" with one of the RFID labels 120c positioned over a single meanderline-like microstrip antenna assembly 210. The meanderline-like microstrip antenna assembly 210 is configured such that the localized electric E field of the meanderline-like antenna 212 couples to the one RFID tag or label 120 that is oriented lengthwise along the length of the meanderline-like microstrip antenna assembly 210. The localized electric E field drives or directs current in two dimensions along the antenna 212.

To prevent the near-field meanderline-like microstrip antenna assembly 210 from reading or writing to a label 120b or 120d which is nearby to the label 120c being addressed, the microstrip width "$W_M$", length "$L_M$", and overall substrate width "$W_s$" may be adjusted accordingly. As the gap "d" between the RFID labels 120a to 120e is reduced, the microstrip width "$W_M$" is reduced along with the overall substrate width "$W_s$". The size of the gap "d" positions the adjacent labels 120a, 120b, 120d and 120e well beyond the lateral side edges 142a, 142b of the substrate 140 of the meanderline-like microstrip antenna 212, so that the microstrip antenna assembly 210 does not detect the presence of adjacent RFID labels 120a, 120b, 120d and 120e. In the case of the meanderline microstrip antenna, the trace width $W_M$, overall effective length $L_M$, and substrate parameters are adjusted so that an effective current distribution is achieved corresponding to a half-wave to a full-wave structure. This may be achieved by increasing the number of periods $L \cdot_M$ of the meanderline trace per given fixed length $L_M$.

Figure 20:
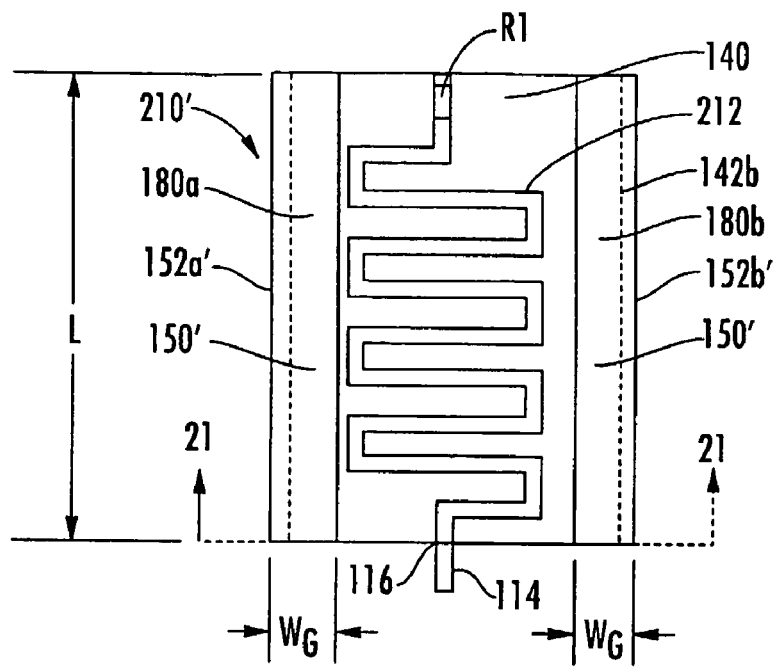
FIG. 20 is a plan view of one embodiment of a meanderline monopole microstrip antenna assembly having an extended ground plane according to the present disclosure.
Figure 21:
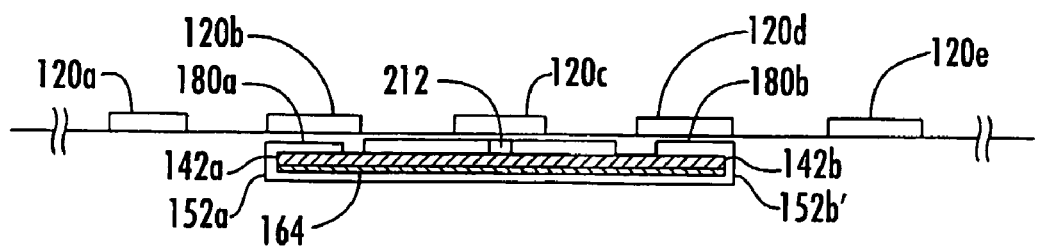
FIG. 21 is a cross-sectional end elevation view taken along line 21-21 of FIG. 20.

In one embodiment, such as the embodiment shown in FIGS. 20 and 21, a meanderline-like microstrip antenna assembly 210' includes an extended or wrap around ground plane. More particularly, the meanderline-like microstrip antenna assembly 210' is the same as meanderline-like microstrip 210 except that in place of ground plane 150, the microstrip line 212 is disposed upon the first surface 140a of the substrate 140 and ground plane 150' is disposed upon at least a portion of the first surface 140a of the substrate 140 and not in contact with the microstrip line 212. In a similar manner as with respect to linear microstrip 110', the ground plane 150' is disposed on the first and second edges 142a, 142b of the substrate 140, respectively, and on the second surface 140b of the substrate 140. The ground plane 150' may be separated from the substrate via one or more dielectric spacers 164.

The ground plane 150' may include flaps or end portions 180a and 180b which overlap the first surface 140a and extend inwardly a distance "$W_G$" towards the edges 212a and 212b, respectively, but do not contact the trace microstrip 212.

As illustrated in FIG. 21, the RFID labels 120a to 120e may be disposed over the antenna assembly 210' in close proximity such that while one label 120c resides over the trace meanderline-like microstrip 212, adjacent labels 120b and 120d reside generally over the flaps or end portions 180a and 180b, respectively, of the ground plane 150'.

Figure 22:
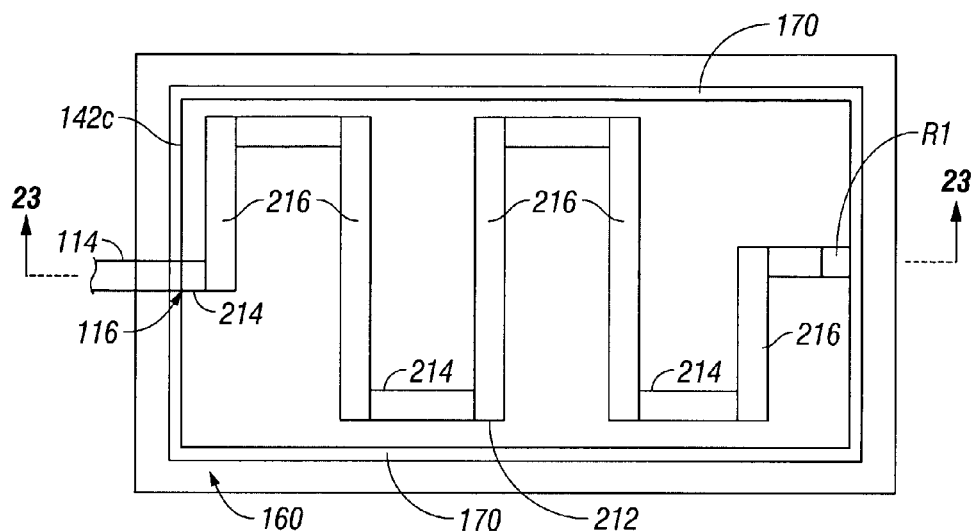
FIG. 22 is a plan view of one embodiment of the meanderline monopole microstrip antenna assembly having a conductive housing according to the present disclosure.
Figure 23:
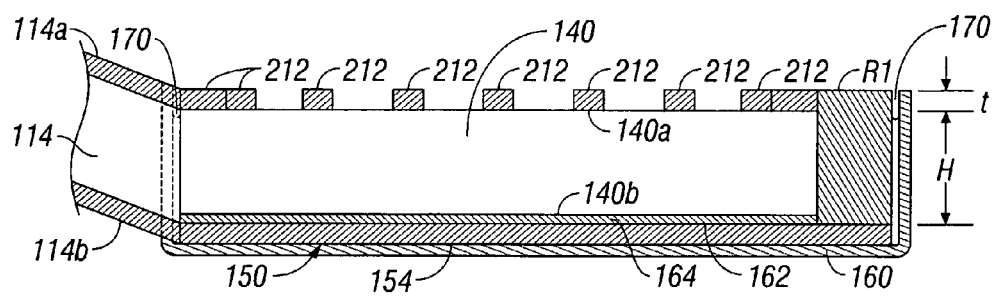
FIG. 23 is a cross-sectional elevation view taken along line 22-22 of FIG. 22.

Furthermore, as illustrated in FIGS. 22 and 23, and in a manner similar to the embodiment shown in FIGS. 14 and 15, the ground plane 150 of the meanderline-like microstrip antenna assembly 210 (or 210') may be electrically coupled to conductive housing 160. The walls 162a to 162d may be separated from the edges 142a to 142d of the substrate 140. The edges 142a to 142d may contact the conductive housing 160 but a space tolerance may be necessary to fit the antenna assembly 110 (or 110') into the housing 160. The walls 162a to 162d also may be separated from the meanderline-like microstrip antenna 212 via the dielectric spacer material 170 so that the conductive housing 160 is electrically separated from the meanderline-like microstrip antenna 212, the capacitive load 122 and the terminating resistor R1. The material of the conductive housing 160 may include aluminum, copper, brass, stainless steel, or similar metallic substance.

As previously discussed, the trace width $W_M$, overall effective length $L_M$, and substrate parameters are adjusted so that an effective current distribution is achieved corresponding to a half-wave to a full-wave structure. This may be achieved by increasing the number of periods $L \cdot_M$ of the meanderline trace per given fixed length $L_M$.

The foregoing embodiments of near field antenna assemblies 110, 110', 210, 210' have been disclosed as having power supplied in an element configuration via the cable 114 and the terminating resistor R1. One of ordinary skill in the art will recognize that the near field antenna assemblies 110, 110', 210, 210' may also be supplied power via a dipole configuration which includes a voltage transformer. The embodiments are not limited in this context.

In view of the foregoing, the embodiments of the present disclosure relate to a near field antenna assembly 110, 110', 210, 210' for reading an RFID label wherein the antenna assembly 110, 110', 210, 210' is configured such that an localized electric E field emitted by the antenna assembly 110, 110', 210, 210' at an operating wavelength "λ" resides substantially within a zone defined by the near field and a radiation field emitted by the antenna assembly 110, 110', 210, 210' at the operating wavelength resides "λ" substantially within a zone defined by a far field with respect to the antenna assembly 110, 110', 210, 210'.

The various presently disclosed embodiments are designed such that the magnitude of the localized electric E field may be increased with respect to the magnitude of the radiation field and the RFID tag or label 120c is read by the antenna or antenna assembly 110, 110', 210, 210' only when the tag or label 120c is located within the near field zone (and is not read by the antenna assembly 110, 110', 210, 210' when the tag or label 120c is located within the far field zone). Moreover, the magnitude of the radiation field may be decreased with respect to the magnitude of the localized electric E field such that RFID tag or label 120c is read by the antenna or antenna assembly 110, 110', 210, 210' only when the tag or label 120c is located within the near field zone (and is not read by the antenna assembly 110, 110', 210, 210' when the tag or label 120c is located within the far field zone). The antenna assembly 110, 110', 210, 210' has a relative dielectric constant "$\in_r$".

The antenna or antenna assembly 110, 110', 210, 210' is configured such that the near field zone is defined by a distance from the antenna or antenna assembly 110, 110', 210, 210' equal to "$\lambda/2\pi$" where "λ" is the operating wavelength of the antenna or antenna assembly 110, 110', 210, 210'. In one embodiment, the near field antenna or antenna assembly 110, 110', 210, 210' operates at a frequency of about 915 MHz such that the near field zone distance is about 5 cm.

A method of reading or writing to RFID tag or label 120c is also disclosed and includes the steps of: providing near field antenna assembly 110, 110', 210, 210' which is configured such that an localized electric E field emitted by the antenna or antenna assembly 110, 110', 210, 210' at operating wavelength "λ" resides substantially within a zone defined by the near field and a radiation field emitted by the antenna or antenna assembly 110, 110', 210, 210' at the operating wavelength "λ" resides substantially within a zone defined by a far field with respect to the antenna assembly 110, 110', 210, 210', and coupling the localized electric E field of the near field antenna assembly 110, 110', 210, 210' to RFID tag or label 120c which is disposed within the near field zone.

The effective length L or $L_M$ of the antenna assembly 110, 110', 210, 210' may be such that a the current distribution directed through the antenna causes a waveform having a wavelength proportional to nv/f where v is the propagation wave velocity equal to the speed of light divided by the square root of the relative dielectric constant of the antenna assembly 110, 110', 210, 210', f is the frequency in Hz, and n ranges from about 0.5 for a half-wavelength to 1.0 for a full-wavelength.

The method may also include the step of increasing the magnitude of the localized electric E field with respect to the magnitude of the radiation field such that the RFID tag or label 120c is read by the antenna assembly 110, 110', 210, 210' only when the tag or label 120c is located within the near field zone but is not read by the antenna assembly 110, 110', 210, 210' when the tag or label 120c is located within the far field zone.

The method may also include the step of decreasing the magnitude of the radiation field with respect to the magnitude of the localized electric E field such that the RFID tag or label 120c is read by the antenna assembly 110, 110', 210, 210' only when the tag or label 120c is located within the near field zone but is not read by the antenna assembly 110, 110', 210, 210' when the tag or label 120c is located within the far field zone. The method may include the step of configuring the antenna assembly 110, 110', 210, 210' such that the near field zone is defined by a distance from the antenna assembly 110, 110', 210, 210' equal to "λ/2π" where "λ" is the operating wavelength of the antenna. The method may further include the step of operating the near field antenna at a frequency of about 915 MHz such that the near field zone distance is about 5 cm. The effective length L or $L_M$ of the antenna assembly 110, 110', 210, 210' may be such that the current distribution directed through the antenna causes a waveform having a wavelength proportional to nv/f where v is the propagation wave velocity equal to the speed of light divided by the square root of the relative dielectric constant of the antenna assembly 110, 110', 210, 210', f is the frequency in Hz, and n ranges from about 0.5 for a half-wavelength to 1.0 for a full-wavelength.

It is envisioned that the advantageous characteristics of the presently disclosed near field antenna assemblies include:

(1) A read/write range to RFID labels 120a to 120e which is limited to a near field distance $$d << \frac{\lambda}{2\pi};$$

(2) A majority of field energy of the near field antenna 112 or 212 is dissipated in the terminating load resistor R1;
(3) A near field antenna assembly that exhibits a low Q factor compared to a radiating far field antenna assembly;
(4) A wide operating bandwidth resulting from the low Q factor is useful for wide band worldwide UHF applications;
(5) A wide operating bandwidth and low Q factor allow simplified RFID reader electronics without a need for frequency hopping to prevent readers from interfering with one another;
(6) A near field antenna assembly exhibits low radiation resistance and radiation efficiency compared to a radiating antenna assembly. Therefore, the far field radiation is substantially reduced;
(7) A near field antenna assembly configured with a microstrip type antenna with trace dimension, substrate properties, and ground plane is designed to operate ranging from a half-wave antenna to a full-wave antenna;
(8) An element feed configuration where the electrical input or cable directly attaches to the beginning of the microstrip antenna and the ground of the connector directly attaches to the ground plane on the bottom of the substrate provides a simpler, more cost effective feed configuration as compared to an alternative differential feed configuration which may require a transformer;
(9) A conductive housing with an open top side where the near field antenna assembly is placed which is grounded to the ground plane of the antenna assembly. The conductive housing helps minimize stray electric fields that tend to couple to adjacent RFID labels which are adjacent to the RFID label disposed directly over the microstrip antenna.
(10) Localization of the emitted electric fields to the near field zone facilitates compliance with regulatory requirements.

As a result of the foregoing, the embodiments of the present disclosure allow RFID labels to be programmed in close proximity to one another. For example, RFID labels on a roll are characterized by having a small separation distance between each label. The embodiments of the present disclosure do not require the labels to be placed a significant distance apart and prevent multiple labels from being read and programmed together. Also, the embodiments of the present disclosure facilitate the identification of a defective label which is disposed next to a properly functioning label.

While the above description contains many specifics, these specifics should not be construed as limitations on the scope of the present disclosure, but merely as exemplifications of preferred embodiments thereof. Those skilled in the art will envision many other possible variations that are within the scope and spirit of the present disclosure.

What is claimed is:
1. A near field RFID antenna assembly having a substantially linear element microstrip antenna, the near field RFID antenna assembly comprising:
  a substrate having a first surface, a second surface and a thickness defined between the first surface and the second surface;
  a feed point at a first end region of the substantially linear element microstrip antenna;
  a terminating resistor at a second end region of the substantially linear element microstrip antenna, the second end region being opposite the feed point;
  a linear microstrip line disposed upon the first surface of the substrate, the linear microstrip line electrically connecting the feed point and the terminating resistor;
  a ground plane disposed upon the second surface of the substrate and partially disposed upon the first surface of the substrate, the ground plane not being in contact with the linear microstrip line;
  the microstrip antenna configured such that:

a localized electric E field emitted by the microstrip antenna resides substantially within a zone defined by the near field;

the localized electric E field directs a current distribution along a length of the microstrip antenna corresponding to a half wave to a full-wave structure; and an input impedance in ohms at the feed point is substantially equal to the impedance of the terminating resistor.

2. The antenna assembly of claim 1, wherein the substrate includes first and second substrate lengthwise edges positioned between the first surface and the second surface, and wherein the ground plane is disposed upon the first and second substrate lengthwise edges.

3. The antenna assembly of claim 1, wherein the terminating resistor is electrically coupled to the ground plane.

4. The antenna assembly of claim 1, further comprising a dielectric spacer between the ground plane and the second surface.

5. The antenna assembly of claim 1, wherein the thickness of the substrate is defined as H and a width of the linear microstrip line is defined as W.

6. The antenna assembly of claim 5, wherein the linear microstrip line has first and second microstrip lengthwise edges and the linear microstrip line is substantially centered on the substrate, such that each of the first and second substrate lengthwise edges extend a distance of at least two times the width W (2W) from the first and second microstrip lengthwise edges.

7. The antenna assembly of claim 5, wherein the ground plane has a width of at least five times the width W (5W).

8. The antenna assembly of claim 1, wherein the relative dielectric constant $\epsilon_r$ for the substrate ranges from about 2 to about 12.

9. The antenna assembly of claim 1, wherein the input impedance of the microstrip antenna at the feed point is about equal to a characteristic impedance of a cable supplying a feed signal at the feed point.

10. The antenna assembly of claim 1, wherein the linear microstrip line has a thickness ranging from about 10 microns to about 30 microns.

11. The antenna assembly of claim 7, wherein the substrate has a width of at least five times the width W (5W).

12. The antenna assembly of claim 1, wherein the ground plane of the antenna assembly is electrically coupled to a conductive housing.

13. The antenna assembly of claim 1, further comprising a capacitive load electrically coupled to the linear microstrip line.

14. The antenna assembly of claim 1, wherein the antenna assembly is configured such that the localized electric E field of the antenna assembly couples to an RFID label that is oriented lengthwise along a length of the antenna assembly.

15. The antenna assembly of claim 4, wherein the dielectric spacer includes an air gap.

16. A method of communicating with an RFID label, comprising:

providing a near field RFID antenna assembly having a substantially linear element microstrip antenna that includes:

a substrate having:
a first surface;
a second surface; and
a thickness defined between the first surface and the second surface;

a feed point at a first end region of the substantially linear element microstrip antenna;

a terminating resistor at a second end region of the substantially linear element microstrip antenna, the second end region being opposite the feed point;

a linear microstrip line disposed upon the first surface of the substrate, the linear microstrip line electrically connecting the feed point and the terminating resistor; and a ground plane disposed upon the second surface of the substrate and partially disposed upon the first surface of the substrate, wherein the ground plane is not in contact with the linear microstrip line; and placing the RFID label at a distance of $\lambda/2\pi$ or less relative to the near field RFID antenna assembly, where $\lambda$ is an operating wavelength of the substantially linear element microstrip antenna.

17. The method according to claim 16, further comprising operating the near field antenna assembly at a frequency of about 915 MHz.

18. The method according to claim 16, further comprising generating a localized electric E field that resides substantially within a zone defined by the near field using the microstrip antenna.

19. The method according to claim 18, wherein the localized electric E field directs a current distribution along a length of the microstrip antenna corresponding to a half wave to a full-wave structure.

20. The method according to claim 16, further comprising providing an input impedance in ohms at the feed point that is substantially equal to the impedance of the terminating resistor.

* * * * *